United States Patent
Nishikawa et al.

[11] Patent Number: 5,579,148
[45] Date of Patent: Nov. 26, 1996

[54] TWO-DIMENSIONAL OPTICAL SCANNER

[75] Inventors: Hideaki Nishikawa, Obu; Tsukasa Koumura, Toyota, both of Japan

[73] Assignee: Nippondenso Co., Ltd., Kariya, Japan

[21] Appl. No.: 354,015

[22] Filed: Nov. 28, 1994

[30] Foreign Application Priority Data

Nov. 29, 1993 [JP] Japan .................................. 5-297776
Oct. 26, 1994 [JP] Japan .................................. 6-262583

[51] Int. Cl.⁶ ................................................ G02B 26/08
[52] U.S. Cl. ................................... 359/214; 235/472
[58] Field of Search ............................ 235/472; 359/214

[56] References Cited

U.S. PATENT DOCUMENTS

| | | | |
|---|---|---|---|
| 3,532,408 | 10/1970 | Dostal | 359/214 |
| 3,794,410 | 2/1974 | Elliott | 359/214 |
| 4,317,611 | 3/1982 | Petersen | 359/214 |
| 5,245,464 | 9/1993 | Jensen . | |
| 5,268,784 | 12/1993 | Chaya | 359/214 |
| 5,280,165 | 1/1994 | Dvorkis et al. . | |

FOREIGN PATENT DOCUMENTS 4211217   8/1992   Japan ..................................... 359/214

*Primary Examiner*—Harold Pitts
*Attorney, Agent, or Firm*—Cushman, Darby & Cushman

[57] ABSTRACT

A two-dimensional optical scanner not affected by acceleration disturbances. The two-dimensional optical scanner includes a mirror section having at least one mirror surface formed thereon. A first frame is provided outside the mirror section with a first clearance therebetween. First springs connect the mirror section and the first frame and torsionally vibrating about an axis passing through the center of gravity of the mirror section. A second frame is provided outside the first frame with a second clearance therebetween, and second springs connect the first frame and the second frame. The second springs torsionally vibrate about an axis passing through the center of gravity of mirror section. Piezoelectric bimorphs 21, 22, 23, and 24 drive the optical scanner to impart a torsional oscillation to the first springs and the second springs.

22 Claims, 9 Drawing Sheets

TWO-DIMENSIONAL OPTICAL SCANNER

CROSS REFERENCE TO RELATED APPLICATIONS

This application is based upon and claims priority from Japanese Patent Application 5-297776 filed Nov. 29, 1993 and Japanese Patent Application 6-26252583 filed Oct. 26, 1994, the contents of which are hereby incorporated herein by reference.

BACKGROUND OF THE INVENTION

1. Field of the Invention

This invention relates to a means for light beam scanning in optical information readers, such as bar code readers. More particularly, the present invention relates to two-dimensional optical scanners, which enable multi-directional reading of bar code symbols, reading of multi-stage bar codes, and reading of two-dimensional bar codes.

2. Related Art

Recently, bar code readers have been widely used in various fields, e.g. POS (Point of Sale, i.e. check out counters) in supermarkets and product distribution. Various sizes of bar code labels, from small to large, appear on products. Bar code readers are classified according to the reading method used to gather information, such as the light-pen type, CCD image sensor type, and laser scanning type.

Among them, the bar code readers of the laser scanning type are widely used because they have the ability to read bar codes at a distance from the bar code label (remote reading) and can read the myriad of label sizes that are commonly found, by adjusting the distance between the label and the reader. The bar code readers of the laser scanning type can be classified according to operating style into the fixed type and the hand-held type and according to the scanning method into the one-dimensional scanning type and the two-dimensional scanning type. Moreover, the two-dimensional scanning readers are classified into the multi-directional scanning type (hereinafter referred to as the multi-scanning type) and the raster scanning type.

At first, the one-dimensional scanning type reader scans a bar code in one direction to read the bar code. Thus, it is necessary to align the reader with the bar code label or to set the bar code label so that it is disposed in the scanning direction of the laser beam. Since this type has a relatively simple scanning mechanism and is helpful in reducing the size of the reader, it is mainly used with hand-held readers.

On the other hand, the multi-scanning reader among the two-dimensional scanning type readers has the following advantages. The multi-scanning reader can read bar codes on labels applied in various directions because it emits a laser beam in various directions and, therefore, it is possible to read bar codes without aligning the bar code reader or bar code label to the scanning direction.

The raster-type scanning reader among the two-dimensional scanning readers can grasp two-dimensionally the data shown on the label, so it has become an essential technique for reading of two-dimensional bar codes, and has come into wide use in recent years. However, since this two-dimensional scanning mechanism is relatively complicated and requires a large size, it is difficult to be introduced in hand-held readers. Therefore, it has found few applications.

Recently, a new two-dimensional mechanism aiming at simplifying and downsizing the reader, e.g. a method of oscillating a mirror through relative movement of four resonating piezoelectric bimorphs was disclosed in Japanese Patent Application Laid-Open No. 4-505969, (equivalent to PCT international publication WO 90/01715) has been proposed. However, in the method disclosed in this document, one mirror is connected with four bimorphs by using rubber bearings. Thus, the obtained mechanism has a fragile structure. Setting of a large scanning angle may result in brittle fracture of piezoelectric bimorphs because the resonance of the piezoelectric bimorphs is utilized. Moreover, the resonant frequency of the piezoelectric bimorphs is considerably high, approximately 2 kHz, and scanning with a light beam at this speed requires a high-speed signal processing circuit for processing received light signals. The current technical level makes it difficult to incorporate the high-speed signal processing circuit into hand-held bar code readers.

Another method of obtaining a two-dimensional scanning pattern is disclosed in Japanese Patent Application Laid-Open No.4-140706. In this document, a method has been proposed in which elastic flexible parts which can vibrate freely in two directions, i.e. bending and torsional directions, are resonated by one laminated piezoelectric element. The light beam is emitted onto the oscillating surface to obtain a two-dimensional scanning pattern. Since this method resonates the elastic flexible parts by a driving means and provides the scanning section which can be rotated at least in one direction by elastic vibration of the elastic flexible parts, the amplitude can be increased by adjusting the resonance of the elastic flexible parts, and any desired resonant frequency can be obtained quite easily by properly designing the oscillator. Thus, this method solves the above-mentioned problems.

Nevertheless, the method disclosed in the above-mentioned application has a disadvantage, that is the scanning pattern may vary when acceleration is added as a disturbance because an oscillating force is generated by inertial forces obtained by applying oscillation at a resonant frequency to the unbalanced structure. Therefore, this method is considered to be rather difficult to apply with such equipment as hand-held bar code readers.

SUMMARY OF THE INVENTION

This invention was developed in view of the above-mentioned problems. The purpose of the present invention is to propose a two-dimensional optical scanner in which a multi-directionally free oscillator comprises only torsional oscillators and the torsional oscillators have two or more axes and can be resonated by a uniaxial oscillating force based on the principle of resolving a moment vector in a direction into moment vectors in two or more directions not perpendicular to the direction of the original moment vector, and the structure is not affected by disturbance of acceleration.

To achieve the objects outlined above, the present invention includes a mirror section having at least a reflective surface to reflect light, a first retainer made of a rigid body provided with a given clearance to the mirror section, a first torsionally vibrating member connecting the mirror section and the first retainer made of an elastic material so that it torsionally rotates when affected by specific cyclical external forces and generates rotational torque in a direction reverse to the torsional rotation direction on a scale corresponding to the angle of the torsional rotation and oscillating forcibly the mirror section about the axis passing through the center of gravity of the mirror section, a second retainer made of a rigid body provided with a given clearance to the first retainer, a second torsionally vibrating member connecting the first retainer and the second retainer made of an elastic material so that it torsionally rotates when affected by specific cyclical external forces and generates rotating torque in a direction reverse to the torsional rotation direction on a scale corresponding to the angle of the torsional rotation and oscillating forcibly the mirror section through the first retainer about the axis passing through the center of gravity of the mirror section and the first retainer, and an oscillating means that imparts the specific cyclical external force to the first and second torsionally vibrating members.

The oscillating means includes a first signal generator that generates a first signal to actuate the first torsionally vibrating member, a second signal generator that generates a second signal to actuate the second torsionally vibrating member, an adding means that inputs the first and second signals generated by the first and second signal generators, adds the input signals and outputs the added signal, and a driving means that generates the specific cyclical external force to be applied to the first and second torsionally vibrating members based on the added signal given from the adding means.

It is possible to set the specific cycle for the specific cyclical external force applied to the first and second torsionally vibrating members depending on the moment of inertia on the axes of the torsional movements thereof and the elastic constant of the torsionally vibrating members.

Another possible design of the present invention has the center of gravity of the mirror section and the first retainer coinciding with the center of gravity of the mirror section.

The oscillating means, having the structure described above, imparts specific cyclical external forces to the first and second torsionally vibrating members. Then, the first torsionally vibrating member is torsionally rotated when the specific cyclical external force is applied to it, and it generates rotational torque in a direction reverse to the torsional rotation direction on a scale corresponding to the angle of this torsional rotation and oscillates forcibly the mirror section about the axis passing through the center of gravity of the mirror section. The second torsionally vibrating member is torsionally rotated when the specific cyclical external forces are applied thereto, and it generates rotational torque in a direction reverse to the torsional rotation direction on a scale corresponding to the angle of the torsional rotation and oscillates forcibly the mirror section about the axis passing through the centers of gravity of the mirror section and the first retainer through the first retainer. In other words, the torsionally vibrating members oscillate forcibly the mirror section about the axis passing through the center of gravity of the mirror section and the axis passing through the centers of gravity of the mirror section and the first retainer, respectively, therefore, the oscillatory system is structurally in good balance. As a result, the two-dimensional optical scanner according to this invention is hardly affected by disturbance even if acceleration is applied to the members while they are vibrating.

In addition, the oscillating means causes the first signal generator to generate the first signal to oscillate the first torsionally vibrating member and the second signal generator to generate the second signal to oscillate the second torsionally vibrating member, causes the adding means to add the first and second signals generated by the first and second signal generators, and causes the driving means to output the added signals, so that the driving means applies the specific cyclical external forces according to the added signal to the first and second torsionally vibrating members. Therefore, the first and second torsionally vibrating members are affected by external forces depending on the signal generating condition of the first and second signal generators, respectively, and one or more members are actuated selectively. At the same time, two or more members are actuated simultaneously, thus selective two-dimensional scanning is realized.

For the first and second torsionally vibrating members, the specific cycle of the specific cyclical external force is set according to the moment of inertia on the axis of torsion and the elastic constant of the torsionally vibrating members. Therefore, by properly designing the moment of inertia on the axes of the torsionally vibrating members and their elastic constant, the specific cycle can be changed relatively easily, i.e. the resonant frequency of the torsionally vibrating members can be changed. If the vibratory system is designed so that the center of gravity of the mirror section and the first retainer coincides with the center of gravity of the mirror section, the entire system becomes more balanced structurally and is not overly influenced by disturbances.

BRIEF DESCRIPTION OF THE DRAWINGS

Other objects, features, and advantages of the present invention as well as the operation of the related elements of the structure will become clear to a person of ordinary skill in the art from a study of the following detailed description, the appended claims, and the drawings, all of which from a part of this disclosure. In the drawings:

DETAILED DESCRIPTION OF THE PRESENTLY PREFERRED EXEMPLARY EMBODIMENTS

The embodiments of the present invention are described below with reference to the drawings.

In the first embodiment of the present invention, the two-dimensional optical scanner has a size of approximately 10 mm×10 mm. The optical scanner is applied to a two-directionally torsionally vibrating system and uses piezoelectric bimorphs as a driving source.

Figure 1:
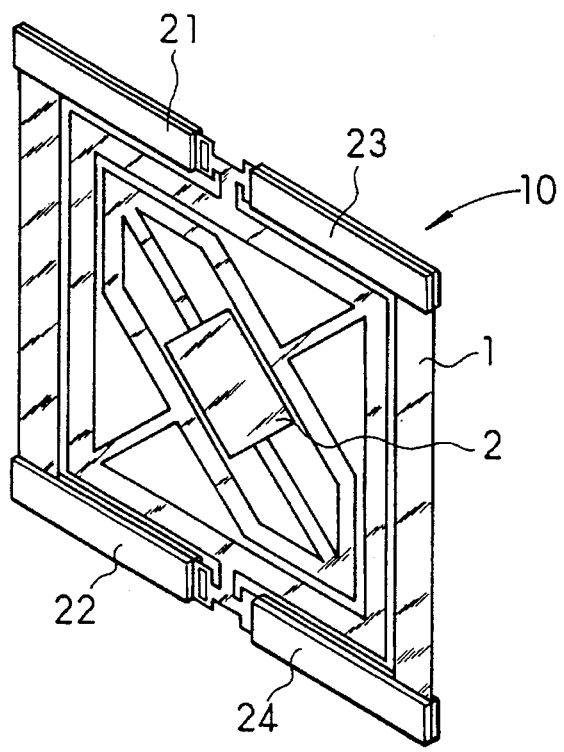
FIG. 1 is a perspective view illustrating the first embodiment of this invention.
Figure 2:
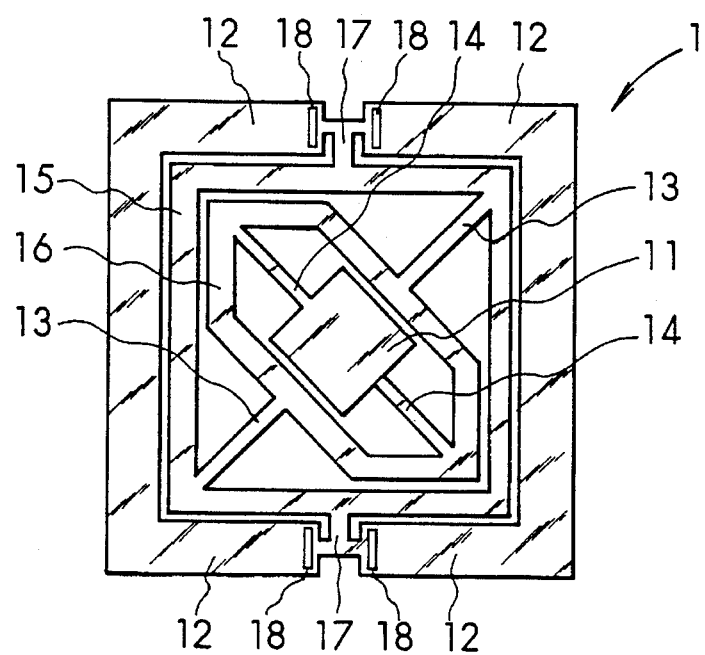
FIG. 2 is a plan view of the structure of the plate in the optical scanner shown in FIG. 1.

FIG. 1 illustrates the first embodiment of the optical scanner according to the present invention, while and FIG. 2 depicts the structure of a plate including the optical scanner.

In FIG. 1, optical scanner 10 comprises thin plate 1, four piezoelectric bimorphs 21, 22, 23 and 24 provided on the upper and lower edges of plate 1 used as a driving source, and mirror section 2 being a reflective surface placed near the center of plate 1. Plate 1 has the structure shown in FIG. 2.

Figure 3:
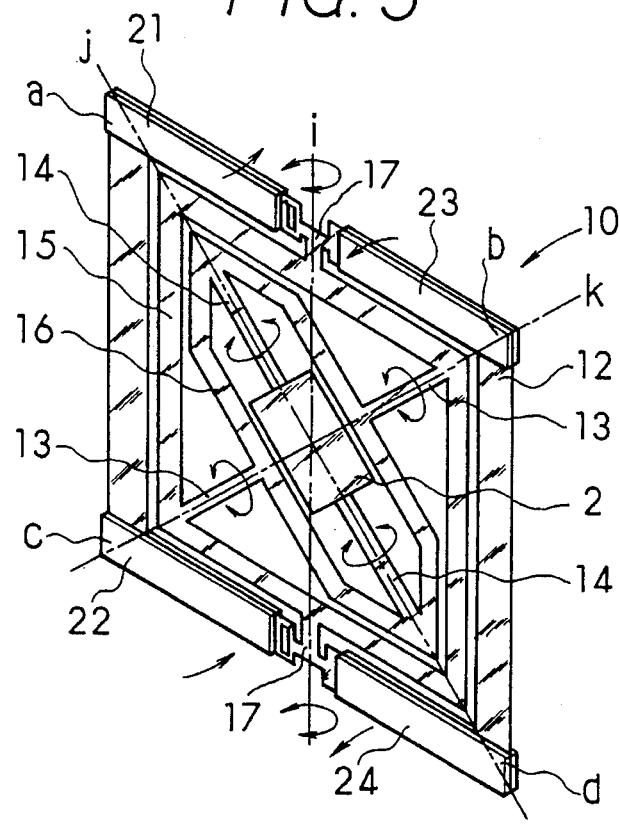
FIG. 3 is a perspective view of the optical scanner shown in FIG. 1 in an operating condition.

As shown in FIG. 2, mirror mount 11 to set mirror 2 is provided near the center of plate 1, and a pair of first springs 14 are provided on the opposite sides of mirror mount 11. Mirror mount 11 is supported by first frame 16 formed outside mirror mount 11 through first springs 14, and as shown in FIG. 3, first frame 16 can rotate freely about axis j. First frame 16 is supported by second frame 15 formed outside first frame 16 via a pair of second springs 13, and second frame 15 can freely rotate about rotational axis k perpendicular to rotational axis j of first springs 14. Moreover, second frame 15 is supported by third frame 12 formed outside second frame 15 through a pair of links 17, and third frame 12 can freely rotate about the oscillating axis i of links 17. The oscillating axis i, as shown in FIG. 3, is displaced at 45° from each of rotational axes j and k. Third frame 12 has four apertures 18 symmetrically located with respect to links 17.

The method of manufacturing optical scanner 10 is described below.

At first, plate 1 as shown in FIG. 2 is prepared from a thin plate (Be-CU, SUS, elinvar, etc.) by etching or electrical discharge machining. Then, a mirror treated with high-reflective coating (Al deposition, Au deposition, etc.) is bonded to the surface of mirror mount 11 formed as a part of plate 1 to complete mirror section 2. Mirrors are bonded to both faces of mirror mount 11 so that the front and back of the mount are well balanced with respect to the axis of first springs 14. Thus, the well-balanced state improves the vibration resistance required when acceleration is applied as a disturbance. Then, piezoelectric bimorphs 21, 22, 23, and 24, i.e., the driving sources, are bonded to both sides of the upper and lower edges of third frame 12 formed on plate 1 in consideration of the direction of polarization of the piezoelectric elements as shown in FIG. 1.

The thus obtained optical scanner 10 has an integral structure wherein a mirror and piezoelectric elements are bonded to one plate, plate 1 made of an elastic material. Therefore, optical scanner 10 excels in the structural strength, and the work of assembly is simple. Because the overall size can be minimized within the limits of the method of machining the plate, equipment having a small scale can be produced. Also, mirror section 2 can be produced by planishing mirror mount 11 and applying a high-reflective coating thereto. The driving sources, i.e. piezoelectric bimorphs 21, 22, 23, and 24, are allowed to have a piezoelectric unimorph structure obtained by bonding the bimorphs to one side of third frame 12.

In this embodiment, mirror section 2 corresponds to the mirror section, first frame 16 corresponds to the first retainer, second frame 15 corresponds to the second retainer, first springs 14 correspond to the first torsionally vibrating member, second springs 13 correspond to the second torsionally vibrating member, and piezoelectric bimorphs 21, 22, 23, and 24 correspond to the oscillating means.

Optical scanner 10 having the above-described structure operates in the following procedure as shown in FIG. 3. In FIG. 3, optical scanner 10 is fixed on a substrate making up an optical system (not shown) in a cantilever beam state where one end a, b, c, and d of each piezoelectric bimorph (driving sources) 21, 22, 23, and 24, respectively, is fixed and the other ends are free. The piezoelectric bimorphs 21, 22, 23, and 24 are bonded in consideration of the direction of polarization of the piezoelectric elements, so that each piezoelectric bimorph produces bending oscillation as shown in FIG. 3 when the same sinusoidal signal is applied to the piezoelectric bimorphs 21, 22, 23, and 24. Accordingly, piezoelectric bimorphs 21 and 22, and bimorphs 23 and 24 give bending oscillation in the same phase, and piezoelectric bimorphs 21 and 23 and the bimorphs 22 and 24 give bending oscillation in reverse phase. These oscillatory movements are converted into torsional oscillations about axis i of second frame 15 through links 17.

The operation and function of mirror section 2 of optical scanner 10 when the bending oscillation is applied by piezoelectric bimorphs 21, 22, 23, and 24 is described below. Mirror section 2 and first frame 16 are wider than first springs 14 and more rigid than first springs 14. Mirror section 2 and first frame 16 are linked through first springs 14. Accordingly, it can be said that the combination of these parts forms a first torsional oscillator having axis j corresponding to the axis of first springs 14 as the axis of rotation. The specific angular frequency of this torsional oscillator, $\omega j$, can be obtained by the following formula:

$$\omega j = \sqrt{kj/Ij}$$

where Ij equals the moment of inertia about axis 3 of mirror section 2, and kj equals the spring constant of first springs 14.

In the same manner, first frame 16 and second frame 15 are wider than second springs 13 and more rigid than second springs 13. First frame 16 and second frame 15 are linked through second springs 13. Accordingly, the combination of these parts forms a second torsional oscillator having axis k corresponding to the axis of second springs 13 as the axis of rotation. The given angular frequency of this torsional oscillator, $\omega k$, can be obtained by the following formula:

$$\omega k = \sqrt{Kk/Ik}$$

where Ik equals the moment of inertia about axis k of mirror section 2, and Kk equals spring constant of second springs 13. Accordingly, mirror section 2 mounted on optical scanner 10 can torsionally vibrate about axes j and k and forms a two-dimensional freely vibrating system. Moreover, rotating axis j of this vibrating system is designed to pass through the center of gravity of mirror section 2. Therefore, the vibrating system about axis j is structurally well balanced when the mirror section 2 is forcibly oscillated. The other axis of rotation, axis k, is designed to pass through the center of gravity of mirror section 2 and first frame 16. Therefore the vibrating system about axis k is also structurally well balanced when mirror section 2 and first frame 16 are forcibly oscillated. Since optical scanner 10 is designed so that the center of gravity of mirror section 2 through which axis j passes coincides with that of mirror section 2 and first frame 16 through which axis k passes, optical scanner 10 is structurally well balanced in both directions of rotation. Therefore, even if acceleration is added as a disturbance during operation, this two-directional vibrating system does not cause eccentricity to the center axis and is hardly affected by the disturbance.

Figure 4:
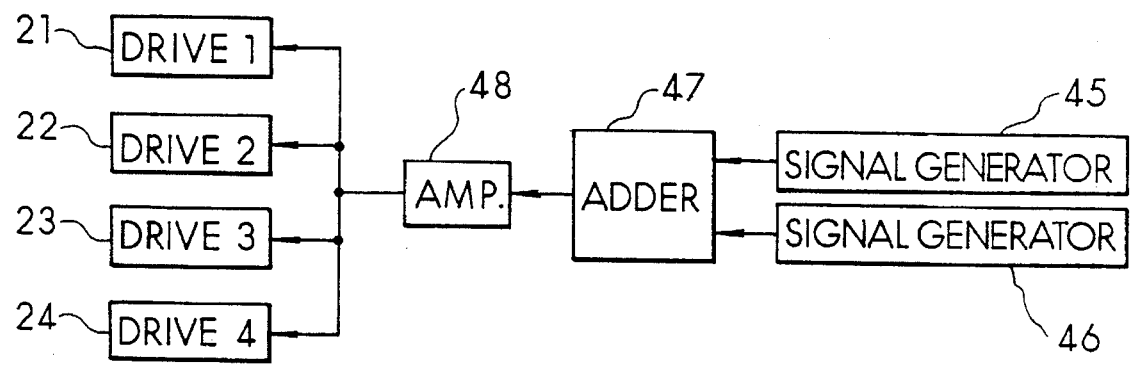
FIG. 4 is a block diagram depicting the driving power circuit of the optical scanner shown in FIG. 1.

The case where optical scanner 10 is actuated by a driving power circuit is explained below. FIG. 4 is a block diagram showing the driving power circuit, and FIG. 5 shows the waveforms of signals in the driving power circuit.

The driving circuit, as shown in FIG. 4, comprises signal generators 45 and 46, adder 47 that adds the sinusoidal signals generated by signal generators 45 and 46, amplifier 48 amplifying the signal generated in adder 47, and a circuit that directs the signal output from amplifier 48 to piezoelectric bimorphs 21, 22, 23, and 24 (drive source).

Figure 5:
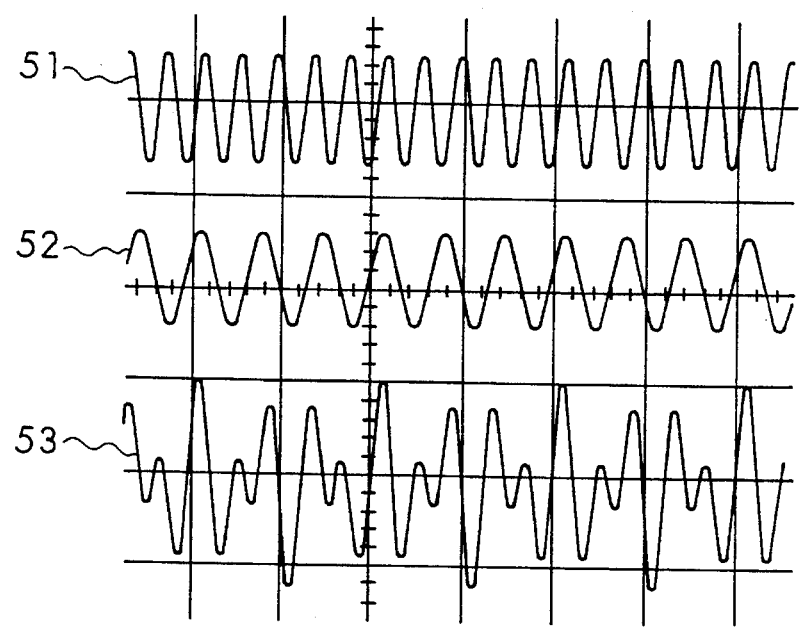
FIG. 5 illustrates waveforms of transmitted signals in the driving power circuit shown in FIG. 4.

The signals generated in signal generators 45 and 46 and adder 47 are plotted in FIG. 5 as sinusoidal signal 51 of the angular frequency $\omega j$ generated in signal generator 45, sinusoidal signal 52 of the angular frequency generated in signal generator 46, and signal 53 generated in adder 47, respectively.

When the sinusoidal signal of the angular frequency $\omega i$ is applied to piezoelectric bimorphs 21, 22, 23, and 24, second frame 15, second springs 13, first frame 16, first springs 14 and mirror section 2 torsionally vibrate at an angular frequency $\omega i$ about the axis i. In this case, mirror section 2, having a moment of inertia, is affected by torsional moment about the axis i and generates an oscillating force in the torsional direction. Then, this torsional oscillating force causes the two-directional torsional vibration, i.e. the torsional vibration about axis j of mirror section 2 and the torsional vibration about axis k.

Assuming that the moment vector of the torsional oscillating force about axis i is Ti, the moment vector can be expressed by the following formula:

$$Ti = T\sin(\omega i \cdot t)$$

where $\omega i$ equals the angular frequency of the oscillating force, t is the time, and T equals the maximum amplitude of moment vector Ti. Maximum T can be set based on the voltage of the driving signal applied to the driving source, the piezoelectric bimorphs 21, 22, 23, and 24. Vector, Ti, can be resolved into moment vectors in the j and k directions, Tj and Tk, and is represented by the following formula.

$$Ti = Tj + Tk$$

The vectors Tj and Tk function as torsional oscillating forces about j and k axes, respectively, to cause this two-directional torsional oscillator to resonate about these axes. For example, if the two-directional torsional oscillator is designed so that the resonant frequencies $\omega j$ and $\omega k$ about axes j and k are equal to each other, the application of a sinusoidal signal of the angular frequency to the driving source causes the torsional oscillator to resonate about axes j and k.

If the two-directional torsional oscillator is designed so that the resonant frequency $\omega j$ about axis j differs from the resonant frequency $\omega k$ about axis k, it is possible to cause the torsional oscillator to resonate independently about the respective axes. In other words, when the sinusoidal signal of angular frequency $\omega j$ is applied to the driving source, i.e. piezoelectric bimorphs 21, 22, 23, and 24, the torsional oscillator resonates about axis j, and when that of angular frequency $\omega k$ is applied to the driving source, i.e. piezoelectric bimorphs 21, 22, 23, and 24, the torsional oscillator resonates about axis k. When the sinusoidal signals of angular frequencies $\omega j$ and $\omega k$ are added and applied to the driving source to get the following state:

$$Ti = T1\sin(\omega j \cdot t) + T2\sin(\omega k \cdot t)$$

it is possible to resonate the oscillator about the axes j and about k simultaneously. Any amplitude of the torsional oscillation about each axis can be set by properly designing values T1 or T2 according to the sinusoidal signal voltage applied to the driving source.

Figure 6:
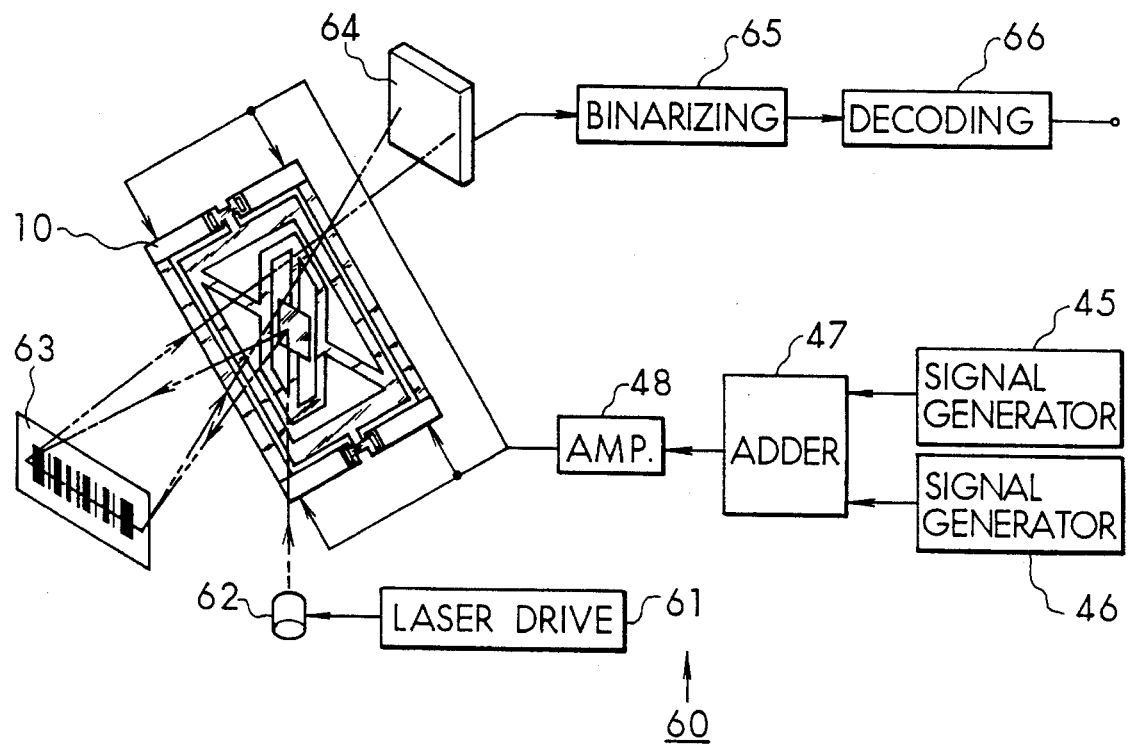
FIG. 6 is a schematic block diagram of an optical information reader using the optical scanner of the first embodiment.

An example of optical scanner 10 applied to an optical information reader 60 is shown in FIG. 6.

In FIG. 6, optical information reader 60 comprises laser diode 62 generating a directive laser beam, laser driving circuit 61 driving laser diode 62, optical scanner 10 reflecting the laser beam generated by laser diode 62 and scanning the laser beam over bar code label 63, light receiving element 64 receiving the reflected light scattered by bar code label 63 and converting the reflected light into an electrical signal, binary circuit 65 converting the analog signal sent from light receiving element 64 into a binary signal, and decode circuit 66 decoding the binary signal obtained in binary circuit 65 as information based on bar code label 63. These components are incorporated in a case (not shown). The structure just described is a hand-held optical information reader, which a user can hold in his hand to read bar codes. Since signal generators 45 and 46, adder 47, amplifying circuit 48 and optical scanner 10 have been described, the explanation of them is omitted here.

Operation of optical information reader 60 will now be described.

First, laser driving circuit 61 inputs a driving signal to laser diode 62 based on a control signal sent from a CPU or the like (not shown) and causes laser diode 62 to emit a laser beam. In this case, optical scanner 10 is driven by signal generating circuits 45 and 46, adder 47 and amplifier 48 and torsionally oscillates mirror section 2. Therefore, the laser beam generated by laser diode 62 is reflected on the torsionally vibrating mirror section 2, deflected at an angle twice as large as the torsional angle of mirror section 2 and scanned across bar code label 63.

The light scattered on bar code label 63 is received by light receiving element 64, which converts the light into an electrical signal depending on the intensity of the received scattered light. The thus obtained electrical signal is converted into a binary signal by binary circuit 65, and decode circuit 66 processes (decodes) the signal according to the contents of bar code 63.

It is possible to make optical information reader 60 a non-continuously operating type, which is started by a trigger switch (not shown) or a continuously operating type not using a trigger switch. For the optical information reader having the above-mentioned structure, the following three specifications are proposed.

Figure 7A:
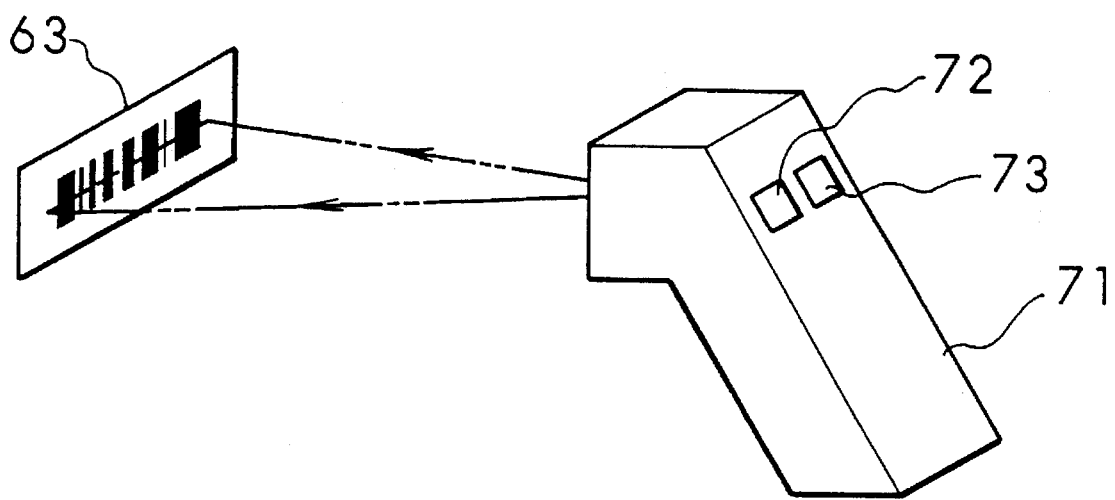
FIGS. 7A and 7B show the scanning state of the optical information reader shown in FIG. 6.
Figure 7B:
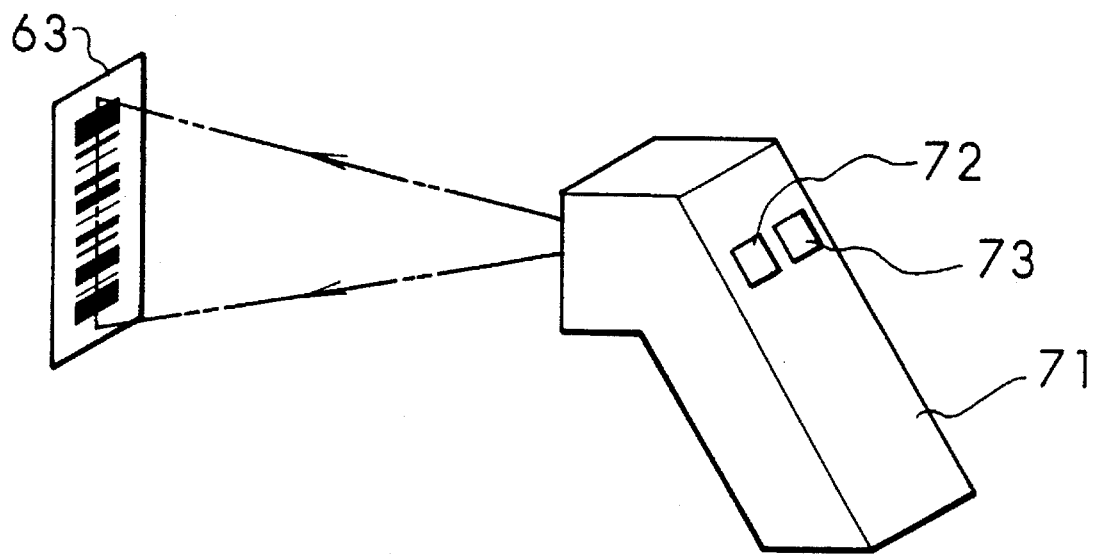

It is possible to make the two rotational axes of optical scanner 10 built in this equipment so that they are resonated separately, so that two-directional linear optical scan pattern, for example the pattern in the horizontal and vertical directions as shown in FIGS. 7A and 7B, can be obtained. When trigger switch 72 is pressed, optical information reader 71 scans bar code 63 by emitting a light beam in the horizontal direction, and when trigger switch 73 is pressed, optical information reader 71 scans in the vertical direction. It is possible to read bar code symbols printed in either direction, horizontal or vertical, by selecting the trigger switch 72 or 73 without changing the direction of the reader 71.

It is also possible that a reader is equipped with an optical scanner having a ratio of resonant angular frequencies of the two torsionally rotating axes of less than 1:2. In this reader, resonating both the torsionally rotating axes gives a curved scan pattern. This scan pattern scans within the scanning range at various angles, therefore it is possible to read bar code symbols printed in almost any direction without changing the direction of the reader.

Figure 8A:
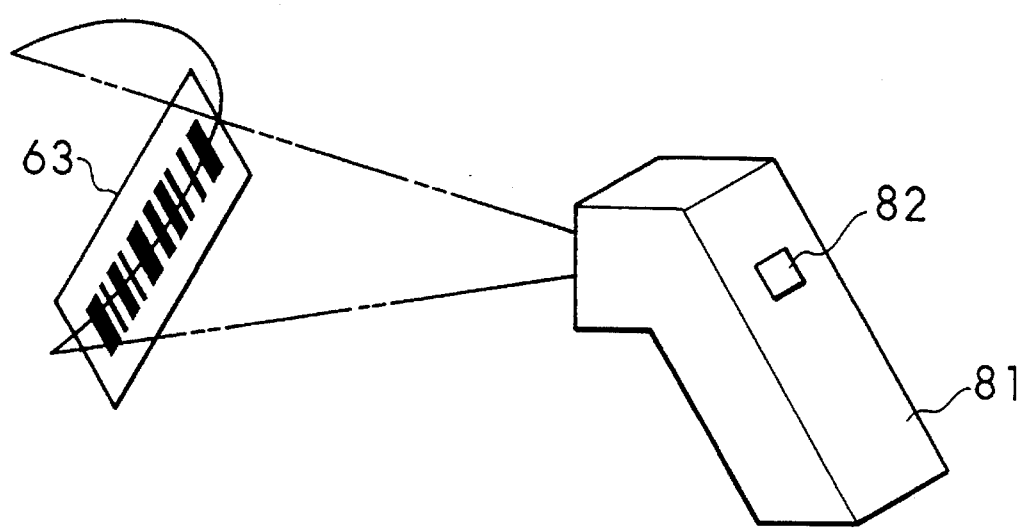
FIGS. 8A and 8B depict another possible scanning state of the optical information reader shown in FIG. 6.
Figure 8B:
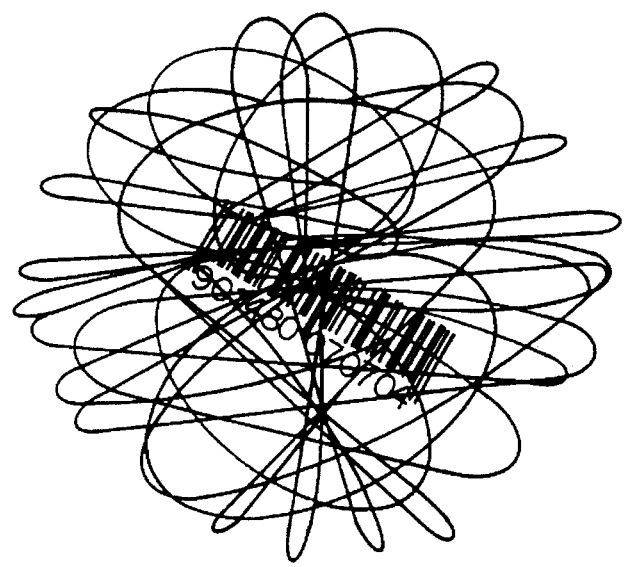

For example, in optical information reader 81 as shown in FIG. 8A, when the resonant angular frequency of one axis is 500 Hz, that of the other axis is 300 Hz, and driving signal to conduct 30-Hz amplitude modulation for driving signal of each axis is determined as shown below:

$$\text{Sin}(2\pi \cdot 30t) \cdot \sin(2\pi \cdot 300t) + \text{Cos}(2\pi \cdot 30T) \cdot si(2\pi \cdot 500t)$$

the scan pattern as shown in FIG. 8B can be obtained. Such a phenomenon occurs because the ratio of resonant angular frequencies of two torsionally rotating axes is less than 1:2, and the torsional angle of each torsionally rotating axis changes with time.

In other words, the torsional angle of one torsionally rotating axis and that of the other torsionally rotating axis exhibits respective characteristic changes. Therefore, in an optical scanner where the ratio of resonant angular frequencies of two torsionally rotating axes is less than 1:2, amplitude modulation with respect to the torsionally rotating axes enables reading of bar code symbols printed in almost any direction. The changes in the angle can be determined by adjusting the frequency signal of amplitude modulation.

Figure 9A:
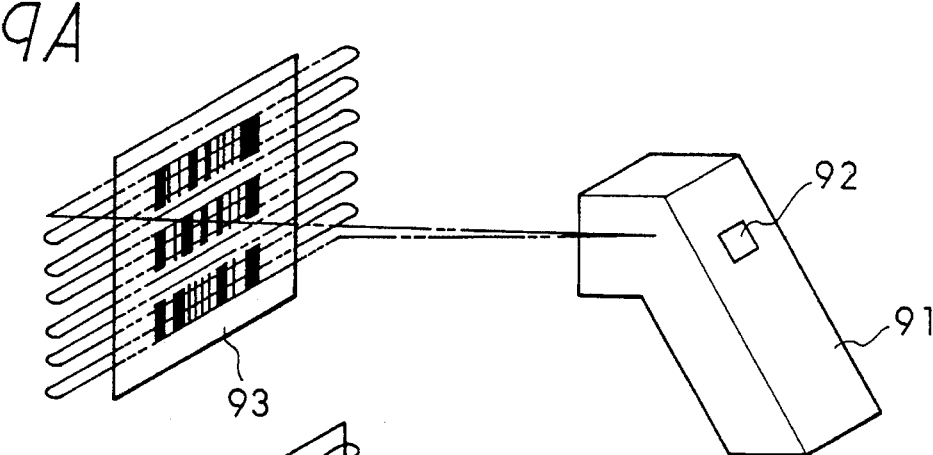
FIGS. 9A and 9B illustrate yet another possible scanning state of the optical information reader shown in FIG. 6.
Figure 9B:
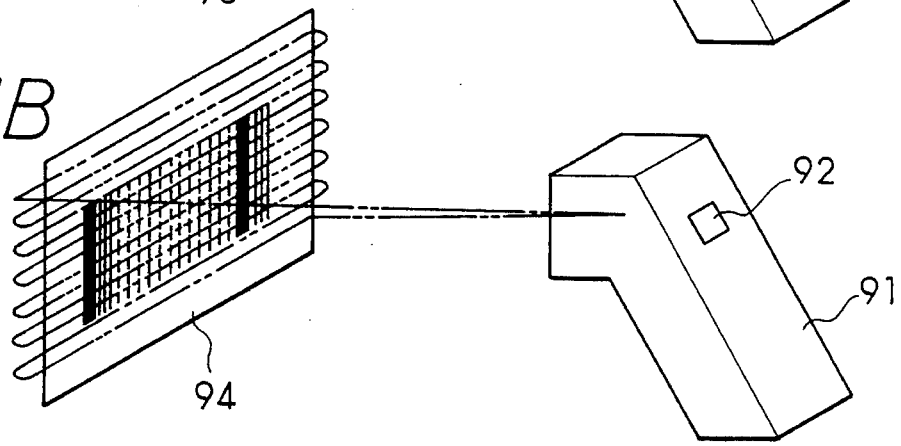

Optical scanner 10 may be designed so that the ratio of the resonant angular frequencies of the two torsionally rotating axes is 1:2 or more. The thus obtained optical scanner 10 produces a raster-type scan pattern as shown in FIGS. 9A and 9B by resonating about both the torsionally rotating axes. Since in this scan pattern the scanner scans almost linearly in one direction in the scanning range, changing the scanning position little by little, it realizes optical information reader 91 applicable to the reading of multi-stage bar code symbols 93 or large two-dimensional bar codes 94. Also, in this embodiment, the resolution in the direction perpendicular to the scanning direction can be set almost freely by adjusting the ratio of resonant angular frequencies.

Figure 10:
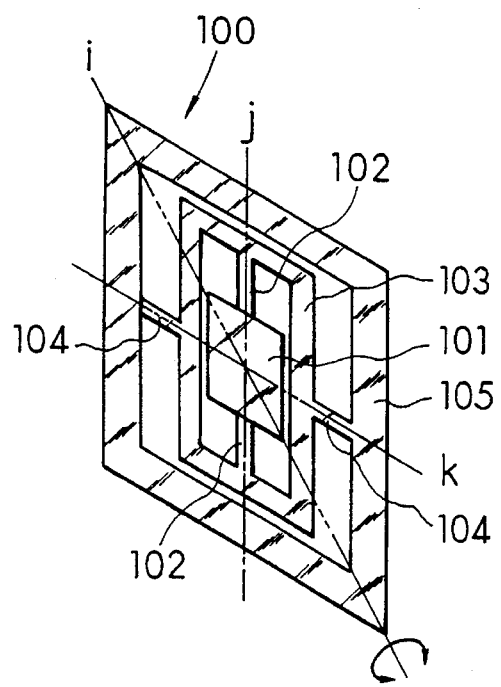
FIG. 10 is a perspective view of the second embodiment according to the present invention.

FIG. 10 illustrates a configuration of the second embodiment of the present invention.

As shown in FIG. 10, in this embodiment, the parts shown in the first embodiment are displaced 45° each, and scanner 100 comprises mirror section 101, first springs 102, second springs 104, and second frame 105, similar to the first embodiment. When mirror section 101 vibrates torsionally in two directions about rotating axes j and k, and oscillating axis i is oscillated torsionally for example by a stepping motor, the same movement as shown in the first embodiment is obtained.

Figure 11:
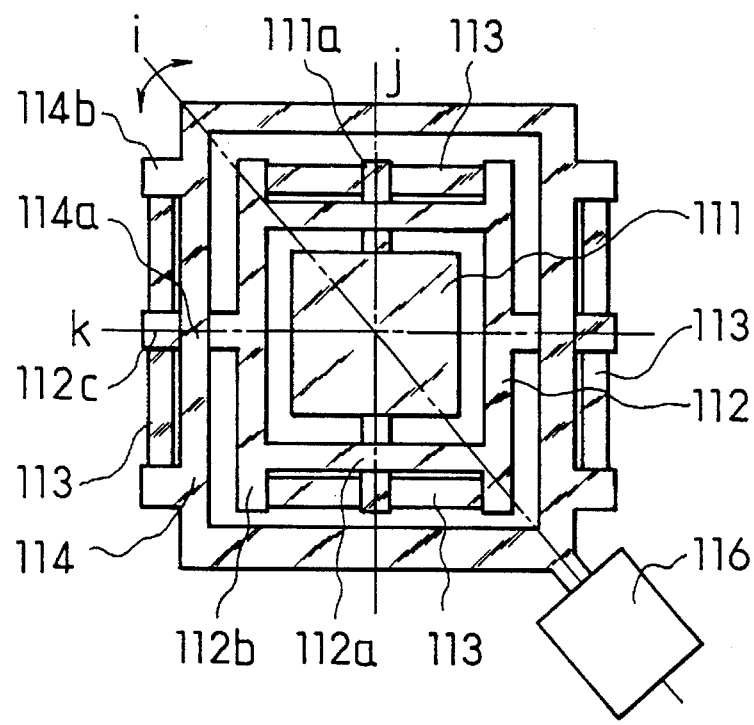
FIG. 11 is a plan view of a third embodiment of the present invention.
Figure 12:
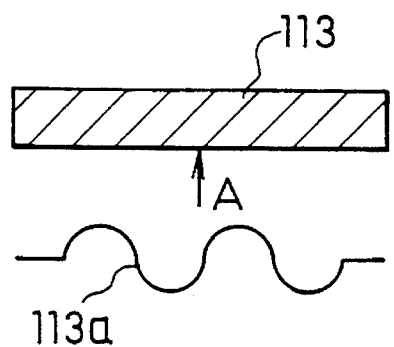
FIG. 12 is a front view and plan view of the leaf spring shown in FIG. 11.

FIG. 11 depicts the configuration of the third embodiment of the optical scanner according to this invention, and FIG. 12 is a front view and cross-sectional view of leaf spring 113 shown in FIG. 11.

In FIG. 12, the element 113a represents the cross section of leaf spring 113 viewed from the direction A. If one end of leaf spring 113 is fixed and the other end is displaced, it generates a counterforce corresponding to the displacement.

In FIG. 11, mirror section 111 is provided with a shaft 111a at the opposite positions relative to the center of gravity of mirror section 111 and frame 112 outside mirror section 111. This frame 112 has holes for supporting shafts 111a at the positions 112a where the shafts 111a are supported. Moreover, frame 111 has fixing parts 112b at the opposite positions relative to shaft hole 112a, and fixing part 112b and mirror section 111 are linked through leaf spring 113. Therefore, if frame 112 is torsionally displaced with respect to mirror section 111, a counterforce is generated by leaf springs 113, thereby oscillating mirror section 111 about axis j.

In the same manner, as shown in FIG. 11, frame 112 is provided with shafts 112c at positions opposite relative to the center of gravity of the mirror section 111 and frame 114 outside frame 112. Frame 114 has shaft holes at positions 114a where shafts 112c are supported. Moreover, frame 114 has two pairs of fixing parts 114b at the opposite positions relative to shaft holes 114a, and fixing parts 114b and shaft 112c of frame 112 are linked through leaf spring 113. Therefore, torsional displacement of frame 112 with respect to frame 114 generates counterforce by the action of leaf spring 113, thereby oscillating frame 112 about axis k. In other words, when frame 114 is oscillated about axis i by stepping motor 116, mirror section 111 is oscillated about axes j and k, and the same effect as in the embodiments stated above can be obtained.

Figure 13:
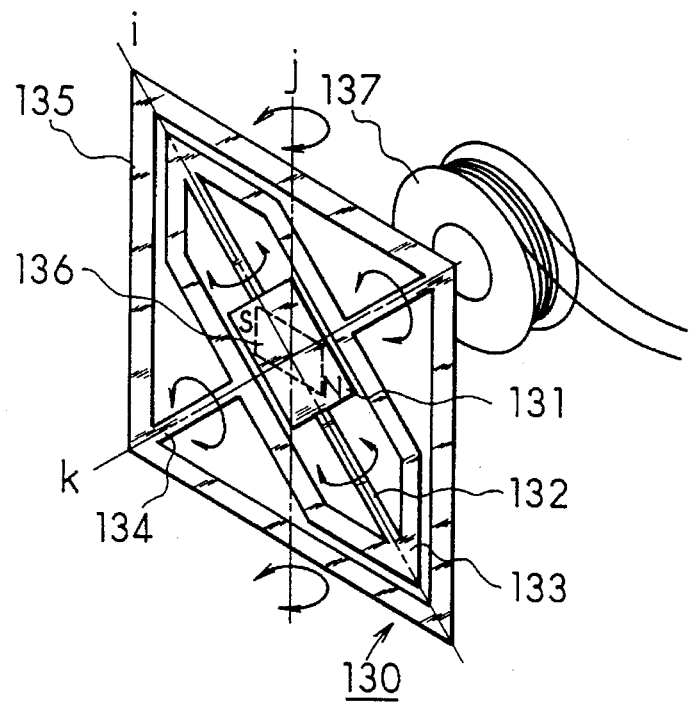
FIG. 13 is a perspective view depicting a fourth embodiment of the present invention.

FIG. 13 illustrates the configuration of the fourth embodiment of the optical scanner according to this invention.

In this embodiment, electromagnetic force generated by permanent magnet 136 and solenoid 137 is used as the oscillating force in place of a driving force by the piezoelectric bimorphs described in the first embodiment.

As stated in the first embodiment, optical scanner 130 comprises mirror section 131, first springs 132, first frame 133, second springs 134, and second frame 135. Permanent magnet 136 is bonded to the back of the mirror on mirror section 131, and solenoid 137 is mounted adjacent permanent magnet 136. Since permanent magnet 136 is located with its magnetic pole directed perpendicularly to axis i, when a sinusoidal signal is applied to solenoid 137, mirror section 131 is torsionally oscillated about axis i. Equalizing the moment of inertia to the mirror bonded to mirror section 131 with that to axis i of the permanent magnet 136 secures a well-balanced state as in the first embodiment. In this fourth embodiment, second frame 135 is fixedly mounted.

Figure 14:
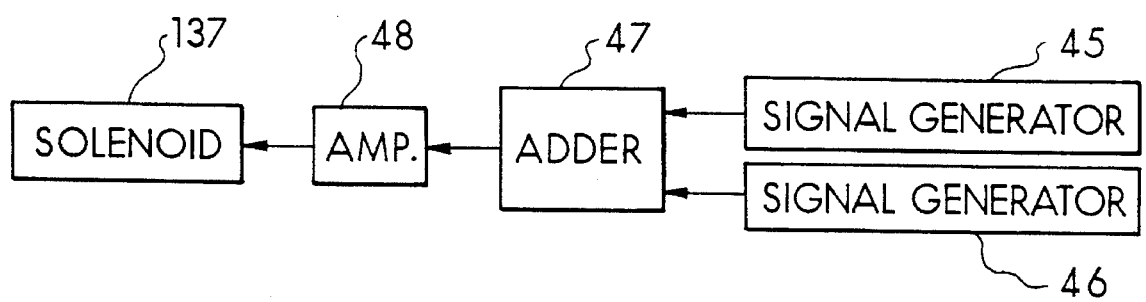
FIG. 14 is a block diagram of a driving circuit for the optical scanner shown in FIG. 13.

FIG. 14 is a driving circuit for the optical scanner according to the fourth embodiment.

In FIG. 14, the driving circuit applies solenoid 137 in place of driving sources 21, 22, 23, and 24 applied in the first embodiment shown in FIG. 4, but the other components are the same as those shown in FIG. 4.

As in the above-mentioned first embodiment, applying the driving signal shown in FIG. 5 to solenoid 137 causes the mirror section 131 to vibrate about axis i. In other words, as in the first embodiment, mirror section 131 has a specific angular frequency $\omega j$ for two-directional torsional oscillation about rotating axis j and a specific angular frequency $\omega k$ for torsional oscillation about rotating axis k, and when a sinusoidal signal of the angular frequency $\omega j$ or $\omega k$ is applied to solenoid 137, mirror section 131 makes an identical movement as that obtained in the first embodiment.

Figure 15:
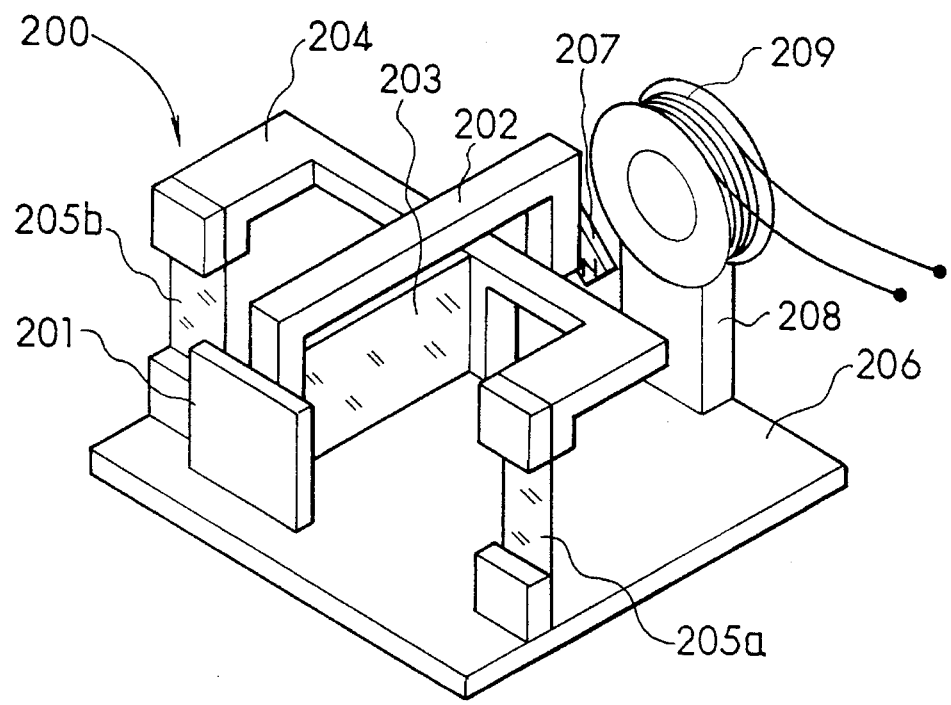
FIG. 15 is a perspective view of a fifth embodiment of the present invention.

FIG. 15 depicts the configuration of the fifth embodiment of the present invention.

In the optical scanner of this embodiment, the part corresponding to the plate in the first embodiment forms a stereostructure in which the springs are arranged three-dimensionally and a permanent magnet and solenoid are used as a driving source. This embodiment is effective when a relatively larger mirror surface is required. In the first embodiment, if a larger mirror surface is applied, the overall dimension of the optical scanner having the first and second frames formed outside the mirror section will be increased, however, in this fifth embodiment, a relatively small-sized equipment can be realized in such a case because the springs are arranged three-dimensionally.

In FIG. 15, first frame 202 has one end to which mirror section 201 is bonded and a second end to which permanent magnet 207 is bonded. Underneath first frame 202, second frame 204 is disposed. Spring 203 has one end bonded to first frame 202 and a second end bonded to second frame 204. Accordingly, first frame 202 is connected to second frame 204 through spring 203. Springs 205a and 205b have one end of each bonded to second frame 204 and the second ends thereof bonded to base 206. Solenoid 209 is disposed at a position opposite to permanent magnet 207 and fixed on base 206 through spacer 208.

Figure 16:
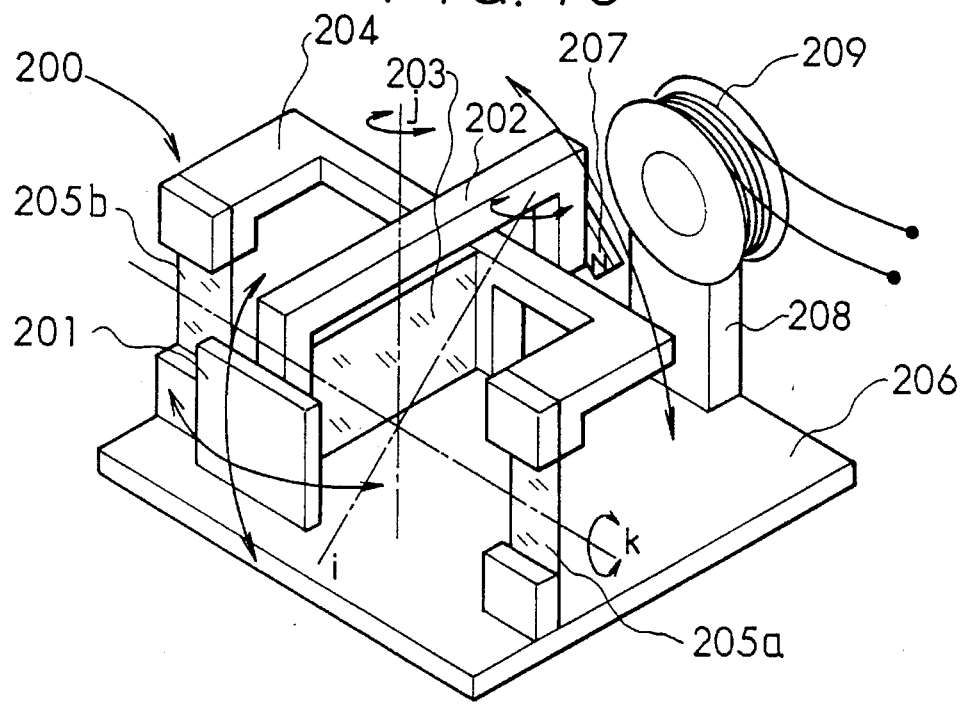
FIG. 16 illustrates the optical scanner of FIG. 15 in an operational condition.

The optical scanner having the above-mentioned structure operates in the following manner as shown in FIG. 16.

In FIG. 16, first frame 202 is connected to second frame 204 through spring 203, and since spring 203 is bent, first frame 202 rotationally vibrates about axis j. The axis of rotation of this vibrating system is arranged so that it runs through the center of gravity of mirror section 201 and first frame 202, therefore, the vibrating system around axis j is structurally well balanced when mirror section 201 and first frame 202 are oscillated forcibly. The specific angular frequency of this rotational vibration is determined based on the moment of inertia around axis j of mirror section 201, first frame 202, and permanent magnet 207 as well as the spring constant of spring 203.

On the other hand, second frame 204 is connected to base 206 through springs 205a and 205b, and the entirety of mirror section 201, first frame 202, spring 203, and second frame 204 rotationally vibrates about axis k. The axis of rotation for this vibrating system, axis k, is disposed so that it runs through the center of gravity of mirror section 201, first frame 202, and second frame 204, therefore, the vibrating system is structurally well balanced also around axis j when mirror section 201 and first frame 202 are forcibly oscillated through second frame 204. The specific angular frequency of this rotational vibration is determined based on the moment of inertia around axis k of the members from mirror section 201 to second frame 204 and the spring constant of springs 205a and 205b. In this structure, the magnetic pole of permanent magnet 207 is disposed perpendicular to axis i, offset 45° from axis j on the plane made of axes j and k.

Therefore, when a sinusoidal signal is applied to solenoid 209, oscillating force about rotating axis i is applied to first frame 202, and rotational vibration around axes j and k is excited, thereby giving the same movement as shown in the above-mentioned embodiments. The circuit to drive the two-dimensional optical scanner in this fifth embodiment is identical with that used in the fourth embodiment shown in FIG. 14. In this fifth embodiment, mirror section 201 and first frame 202 correspond to the mirror section, spring 203 corresponds to the first torsional vibrational member, second frame 204 corresponds to first retainer, springs 205a and 205b correspond to the second torsional vibrational member, base 206 corresponds to the second retainer, and permanent magnet 207 and solenoid 209 correspond to the oscillating means.

For the two-dimensional optical scanner according to this invention, in addition to the piezoelectric elements, various driving sources, such as an electromagnetic solenoid and static electricity, can be applied, and various springs, such as leaf springs and coil springs, can be used. In the above-mentioned embodiments, the two axes of torsion are arranged perpendicularly, and the oscillating axis is tilted at 45° away from the axes of torsion, however, the axes of torsion can be arranged at any angle, and the oscillating axis can be arranged at any angle if it is not at a right angle with the axes of torsion.

This invention has been described in connection with what are presently considered to be the most practical and preferred embodiments. However, the present invention is not to be limited to the disclosed embodiments, but rather is meant to encompass all modifications and alternative arrangements included within the spirit and scope of the appended claims.

What is claimed is:

1. A two-dimensional optical scanner comprising:

a mirror section including at least one reflective surface for reflecting light;

a first retainer being a rigid body provided with a first given clearance around said mirror section;

a first torsional vibrating member connecting said mirror section and said first retainer, said first torsional vibrating member being formed of an elastic material so as to torsionally rotate in a first direction when affected by a first specific cyclical external force and to generate rotational torque in a second direction reverse to said first direction, said first torsional vibrating member forcibly oscillating said mirror section about a first center axis passing through a first center of gravity of said mirror section;

a second retainer formed of a rigid body provided with a second given clearance around said first retainer;

a second torsional vibrating member connecting said first retainer and said second retainer, said second torsional vibrating member being made of an elastic material so that it torsionally rotates in a third direction when affected by a second specific cyclical external force and generates rotational torque in a fourth direction reverse to said third direction, said second torsional vibrating member forcibly oscillating said mirror section through said first retainer about a second axis passing through a second center of gravity of said mirror section and said first retainer, said second axis crossing said first axis;

a third torsional vibrating member connected to said second retainer and oscillating about a third axis crossing said first axis and said second axis when affected by a third specific cyclical external force; and an electrically operated oscillating means for imparting said third specific external force to said third torsional vibrating member, said third specific external force causing said first specific cyclical external force and said second specific cyclical external force.

2. The two-dimensional optical scanner according to claim 1, wherein said electrically operated oscillating means comprises:

a first signal generator for generating a first signal corresponding to said first specific cyclical external force to said first torsional vibrating member;

a second signal generator for generating a second signal corresponding to said second specific cyclical external force to said second torsional vibrating member;

adding means for receiving said first signal and said second signal, for adding said received first signal and second signal, and for outputting said added signal; and driving means for generating said third specific cyclical external force to be applied to said third torsional vibrating member according to said added signal output from said adding means.

3. The two-dimensional optical scanner according to claim 1, wherein:

specific cycles in which said first specific cyclical external force and said second specific cyclical external force are applied to said first torsional vibrating member and said second torsional vibrating member, respectively, correspond to a moment of inertia on an axis of torsional movement and an elastic constant of said first torsional vibrating member, said second torsional vibrating member, and said third torsional vibrating member.

4. The two-dimensional optical scanner according to claim 1, wherein:

said second center of gravity of said mirror section and said first retainer coincides with said first center of gravity of said mirror section;

said first axis, said second axis, and said third axis cross each other at said first center of gravity;

said first axis and said second axis cross perpendicularly; and said third axis crosses equi-angularly to said first axis and said second axis.

5. A two-dimensional optical scanner comprising:

a mirror section having at least one reflective surface for reflecting light;

a first torsional vibrating member and a second torsional vibrating member operatively connected with said mirror section, said first torsional vibrating member and said second torsional vibrating member torsionally rotating by specific cyclical external forces around respective first and second axes intersecting with each other, said first torsional vibrating member and said second torsional vibrating member generating rotational torque in proportion to said torsional rotation to rotate said mirror section at said generated rotational torque;

a retainer for holding said first torsional vibrating member and said second torsional vibrating member so that said first torsional vibrating member and said second torsional vibrating member can torsionally vibrate around said first axis, which passes through at least a center of gravity of said mirror section; and a single oscillating means for applying said specific cyclical external forces to said first torsional vibrating member and said second torsional vibrating member.

6. The two-dimensional optical scanner according to claim 5, wherein:

said first torsional vibrating member and said second torsional vibrating member are torsionally rotated around said respective first and second axes when actuated by an external force in different cycles.

7. The two-dimensional optical scanner according to claim 6, wherein:

said oscillating means can cause torsional vibration about said first and second axes selectively and simultaneously when applying said specific cyclical external forces to said first torsional vibrating member and said second torsional vibrating member.

8. The two-dimensional optical scanner according to claim 5, wherein:

said oscillating means imparts said specific cyclical external forces to said first torsional vibrating member and said second torsional vibrating member through said retainer.

9. The two-dimensional optical scanner according to claim 5, wherein:

said oscillating means imparts said specific cyclical external forces to said first torsional vibrating member and said second torsional vibrating member through said mirror section.

10. A two-dimensional optical scanner comprising:

a light source for generating a light beam;

a mirror section for reflecting said light beam;

torsional vibrating means for rotating said mirror section about first and second perpendicularly crossing axes, said first and second perpendicularly crossing axes passing through a center of gravity of said mirror section;

imparting means for imparting driving forces to said torsional vibrating means; and a single driving circuit for driving said imparting means.

11. The two-dimensional optical scanner according to claim 11, wherein:

said light source is a laser.

12. The two-dimensional optical scanner according to claim 11, wherein said torsional vibrating means comprises:

a first retainer disposed with a given clearance around said mirror section and having a hexagonal shape; and a first member connecting said mirror section with said first retainer, said first member being formed of an elastic material so as to torsionally rotate in a first direction around said first axis when affected by a first specific cyclical external force and to generate rotational torque in a second direction reverse to said first direction, said first member forcibly oscillating said mirror section using said first axis as a center axis.

13. The two-dimensional optical scanner according to claim 12, wherein said torsional vibrating means further comprises:

a second retainer disposed with a second given clearance around said first retainer and having a square shape; and a second member connecting said first retainer with said second retainer, said second member being formed of an elastic material so as to torsionally rotate in a third direction when affected by a second specific cyclical external force and generate rotational torque in a fourth direction reverse to said third direction, said second member using said second axis as a center axis.

14. The two-dimensional optical scanner according to claim 13, wherein said torsional vibrating means further comprises:

a third retainer disposed with a third given clearance around said second retainer and having a square shape, said third member connecting said second retainer with said third retainer;

said imparting means including piezoelectric bimorphs disposed on said third retainer.

15. The two-dimensional optical scanner according to claim 14, wherein:

said first and second axes extend diagonally in said third retainer crossing each other perpendicularly;

said third member is disposed alond a third axis extending equiangularly from said first and second axes; and said bimorphs are disposed on opposite sides of said third axis.

16. A two-dimensional optical scanner comprising:

a mirror section including at least one light reflective surface;

a first retainer disposed around said mirror section;

a first tortional vibrating member extending in a first direction and connecting said mirror section and said first retainer, said first tortional vibrating member being made of a material capable of torsionally rotating around a first axis in said first direction when an external force is applied;

a second retainer disposed around said first retainer;

a second tortional vibrating member extending in a second direction which is perpendicular to said first direction and connecting said first retainer and said second retainer, said second tortional vibrating member being made of a material capable of tortionally rotating around a second axis in said second direction when said external force is applied; and oscillating means for causing a rotational oscillation around a third axis which extends equi-angularly from said first axis and said second axis, said rotational oscillation applying said external force to said first torsional vibrating member and said second torsional vibrating member.

17. The two-dimensional optical scanner according to claim 16, wherein:

said second retainer is shaped in a rectangular form; and said third axis of said rotational oscillation extends diagonally to said second retainer.

18. The two-dimensional optical scanner according to claim 16, wherein:

said second retainer is shaped in a rectangular form;

said first direction and said second direction are diagonal to said second retainer; and said oscillating means includes:

a permanent magnet attached to said mirror section, and a solenoid disposed adjacent to said permanent magnet.

19. The two-dimensional optical scanner according to claim 16, further comprising:

a third retainer disposed around said second retainer; and a link extending in a direction of said third axis and connecting said second retainer and said third retainer;

wherein all of said mirror section, said first retainer, said second retainer, said third retainer, said first tortional vibrating member, said second tortional vibrating member, and said link are made of a thin elastic sheet material.

20. The two-dimensional optical scanner according to claim 19, wherein said oscillating means includes:

a plurality of bimorphs attached to said third retainer symmetrically with respect to said third axis.

21. The two-dimensional optical scanner according to claim 20, wherein said oscillating means further includes:

signal generating means for applying an electric signal to said plurality of bimorphs, said electric signal being a composite of a first signal and a second signal respectively defining a first torsional rotation of said first tortional vibrating member and a second tortional rotation of said second torsional vibrating member.

22. The two-dimensional optical scanner according to claim 19, wherein:

said first retainer is shaped in a hexagonal form;

said second retainer and said third retainer are each shaped in a rectangular form; and said first tortional vibrating member and said second tortional vibrating member extend diagonally to said second retainer and said third retainer.

* * * * *